Figure 1:
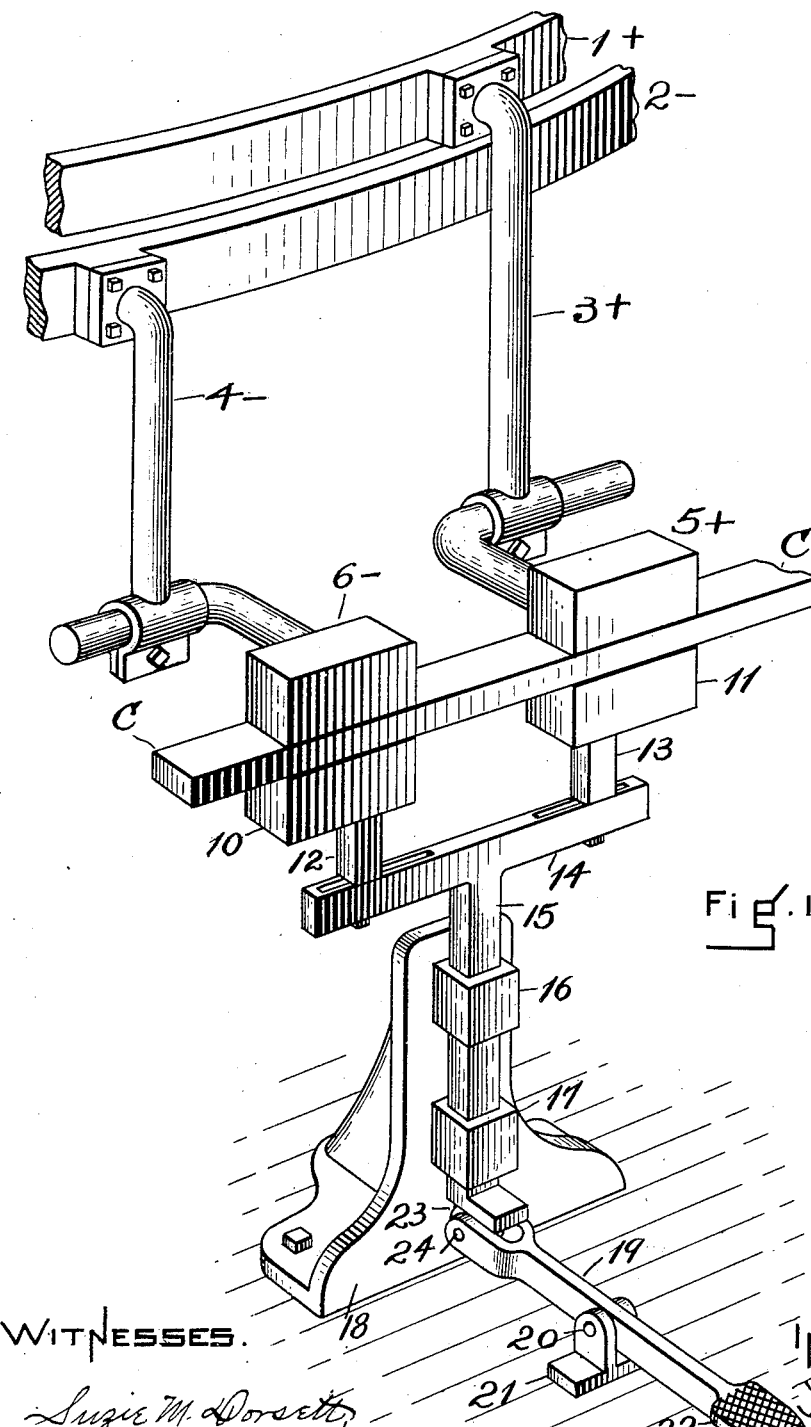

(No Model.) 2 Sheets—Sheet 1.
G. D. BURTON.
APPARATUS FOR ELECTRICALLY WORKING AND WELDING COPPER.
No. 558,480. Patented Apr. 21, 1896.

WITNESSES.
Suzie M. Dorsett,
Ian G. Cameron,

INVENTOR.
G. D. Burton

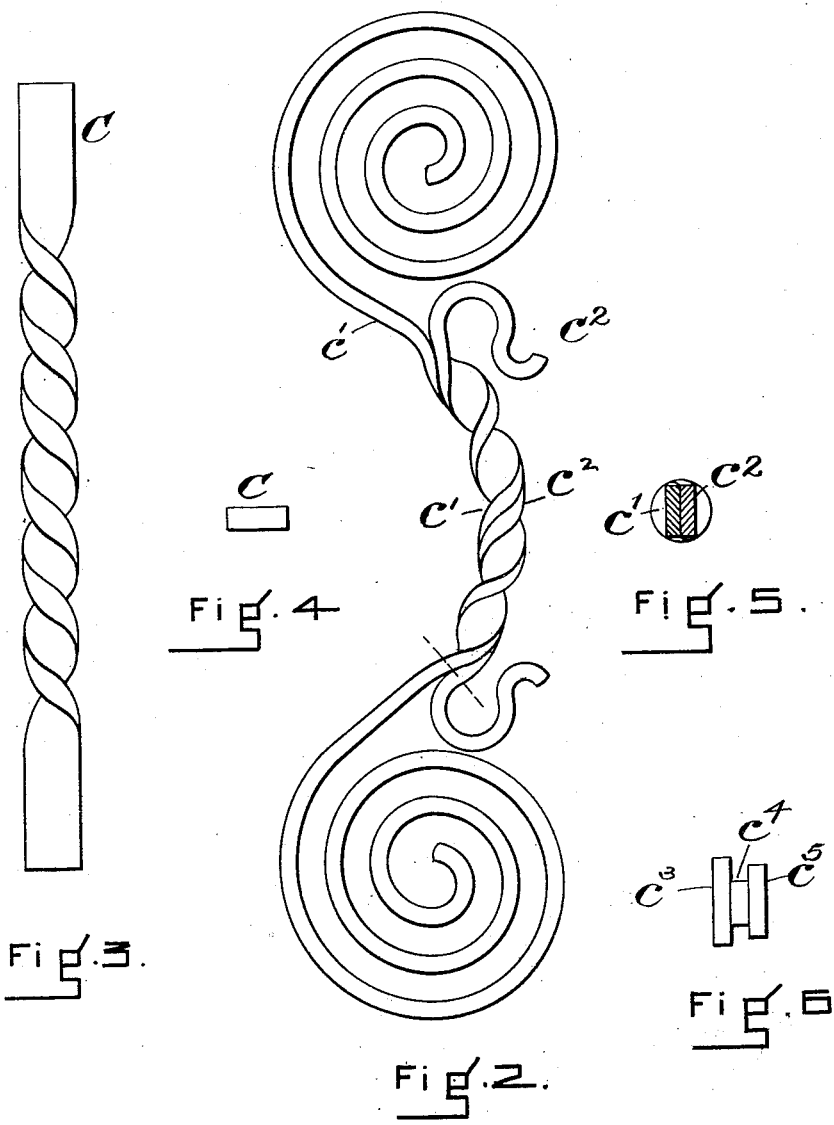

UNITED STATES PATENT OFFICE.

GEORGE D. BURTON, OF BOSTON, MASSACHUSETTS.

APPARATUS FOR ELECTRICALLY WORKING AND WELDING COPPER.

SPECIFICATION forming part of Letters Patent No. 558,480, dated April 21, 1896.

Application filed August 11, 1893. Serial No. 482,934. (No model.)

*To all whom it may concern:*

Be it known that I, GEORGE D. BURTON, of Boston, in the county of Suffolk and State of Massachusetts, have invented a new and useful Improvement in Apparatus for Electrically Working and Welding Copper, of which the following is a specification.

My invention relates to useful constructions and combinations of the several parts of the apparatus for working and welding copper, substantially as hereinafter described and claimed.

Heretofore it has been considered practically impossible to weld copper bars together or to work them into ornamental forms and shapes of many kinds requiring repeated bending, hammering, heating, or similar manipulation. The reason for this failure to so weld or work copper bars is important to a correct understanding of my invention and is as follows, viz: When it was attempted to bend or hammer or otherwise work the copper bars cold, they became hard and stiff under the operation very quickly, so as to require repeated annealings between every operation of working applied to them. This was not only difficult and costly, but left the various parts of the work of different degrees of hardness—that is to say, the parts already worked into final form would be so soft as to be readily bent out of that form, while the parts requiring reworking by twisting, drawing, bending, or hammering would become quite hard and stiff and perhaps cracked on the surface before the operation was completed. If it was attempted to work the copper bars hot, the same difficulty arose in welding or working them.

Copper is so rapid a conductor of heat as to require the surface to be raised to a high temperature by an ordinary forge or furnace in order to heat the middle portion of the bar or bars sufficiently to either weld or bend and work them, the heat being radiated off rapidly into the atmosphere instead of penetrating inward. This radiation of the heat from and through the copper required it to be raised to a much higher temperature than is necessary to actually weld the pieces together, so that they might become too cold for welding before the bars were placed together for the purpose. When, however, the copper was raised to this high degree of heat in the attempt to weld it, the oxygen of the atmosphere coming in contact with the copper bar formed in its entire exterior surface cuprous oxid, which is neither capable of being welded, bent, nor worked, and makes the copper on the surface very hard, brittle, and "cold-short." The formation of this cuprous oxid therefore absolutely prevented the welding and substantially prevented the working of the copper hot into finished metal work.

My invention is to be carried out by the application of electricity to the heating of the copper bars, and the apparatus possesses certain areas of conductors and contact-electrodes sufficient to bring the copper bar to the heat required, but the apparatus used should be capable of clamping and unclamping the copper bars quickly to and from the electrodes in order to enable them to be handled with sufficient rapidity on account of the extremely-rapid radiation of the heat from the copper bar. In fact, it is largely upon this quickness of handling by the operator that the success of my invention depends under the best conditions.

I have illustrated one form of apparatus for carrying out my process in the accompanying drawings, as well as one or two examples of work performed.

In the drawings, Figure 1 is a front elevation of an electrical heating apparatus. Fig. 2 is an example of two pieces of copper welded and twisted together at their central portions by my apparatus and having their ends formed into ornamental shapes. Fig. 3 is an example of a copper bar which has been twisted into an ornamental form by my apparatus. Fig. 4 is an end view of the bar shown in Fig. 3. Fig. 5 is a transverse section across the welded bars shown in Fig. 2. Fig. 6 is a side view of three short copper bars welded together by my apparatus.

The positive and negative conducting-rings 1+ and 2− of an electric converter, substantially such as is shown and described in the patent of Burton, Eddy, and Briggs, No. 475,232, dated May 17, 1892, have attached to them the conducting-arms, of copper, 3+ and 4−, as shown. The ends of these arms terminate in the electrodes 5+ and 6−, formed of copper. The converter should have its primary and secondary coils so arranged as to produce a current of lower voltage and higher amperage than the current used for working iron or brass, and as nearly as I can estimate a current of from two to four and one-half volts and from eight to nine thousand amperes will heat bars of copper, such as are ordinarily used for ornamental metal-work, say eight to twelve inches long by one inch square or less. The electrodes 5+ and 6− must also be large enough in cross area and bearing-surface, in proportion to the piece or pieces of copper to be heated, so that they will not heat themselves and become soft and heat the copper bar underneath their surfaces. The conductors 3+ and 4− must also be made large enough in cross-section. They should be at least three times the size in cross-section of that of the piece of copper to be heated, and the electrodes 5+ 6− should be at least four times the size and bearing-surface of the cross-section of the piece of copper to be heated. These dimensions will give good results.

Care must be taken that the voltage is maintained at a sufficient degree to force the electric current through the copper bar as its heat increases; but if this be accomplished properly any greater voltage will be a disadvantage rather than an advantage.

C is the copper bar to be heated by the application of the electrodes. It is held up against the latter by two copper blocks 10 11, which are attached to wooden uprights 12 13. These are framed into a wooden cross-bar 14 at its outer ends, which is attached to the wooden rod 15, sliding in the ears 16 17, attached to the upright casting 18, which is bolted to the floor of the room. A lever 19 is pivoted at 20 between ears of the holder 21, so that one end of it comes under the sliding upright 15, and the other end has attached to it the pedal 22. The end which reaches under the upright is provided with a roller 23, running on the axis 24 in this bifurcated end of the lever. This roller serves to take the friction off when the lever is pressed up against the sliding rod 15. By pressing with the foot upon the pedal the copper blocks 10 11 are pressed upward against the lower side of the copper bar C and assist in preventing it from being melted or overheated where the electrodes come in contact with it. The bar thus heats between the electrodes in its core or center, and the operator should be careful to observe by the color of the bar that it does not reach a red heat on its exposed surface, which would cause the formation by the oxygen of the atmosphere of cuprous oxid upon the surface and destroy the possibility of welding the bar or successfully working it under heat to a finished copper surface.

By raising the heat of the bar between the electrodes to a point just below the red heat, at which cuprous oxid will be formed, the heat of the central portion of the copper bar will be much higher and approximating to fluidity, and the difference between the heat of the external surface and of the internal core of the bar will be much greater than that of iron under like conditions—for example, because of the superior conductivity of the copper allowing a more rapid radiation from the external surface. When the bar has been brought to this degree of heat, as will be determined by the operator from its color, it is to be taken out quickly from the electrodes and twisted into the form shown in Fig. 3, when the finish of the surface of the bar will be found to be unimpaired, and if the bar be allowed to cool it will be found to be soft and in an annealed condition ready for further bending or hammering, the first working of it not having stiffened or hardened it as if it were attempted to be worked cold.

By taking two bars of copper, simultaneously heated, as described, and quickly laying their flat surfaces together and pressing them—as, for instance, by the twisting process shown in the copper bars $c'$ $c^2$ of Fig. 2—the exclusion of the atmosphere from the contiguous surfaces will cause the internal heat of the two bars to weld them together, the formation of cuprous oxid, being avoided on these surfaces by the exclusion of the atmosphere allowing the copper surfaces to weld themselves together, as shown.

In Fig. 6 the copper bars $c^3$ $c^4$ $c^5$ are shown as being welded together in a similar manner by the use of pressure after the bars have been heated, they being simultaneously brought to a proper degree of heat between different sets of electrodes on the converter.

The conducting-arms 3+ and 4− may be made adjustable, if desired, so as to present a greater or less space between the electrodes, substantially as shown in my Letters Patent No. 475,183, dated May 17, 1892, and a longer or shorter bar can thus be heated, as may be desired.

What I claim as new and of my invention is—

The combination, in an electric heating apparatus, of the conductors 3+ and 4− connected to the converter, the electrodes 5+ and 6− arranged to bear upon the bar to be heated, the metal electric conducting-blocks 10 and 11 mounted on insulating sliding supports, arranged to move toward and from the electrodes to clamp the bar to be heated between the contact-surfaces of the latter and those of said blocks, and a lever arranged to operate upon said sliding supports to clamp and unclamp said blocks, substantially as described.

GEO. D. BURTON.

Witnesses:
E. F. PHILIPSON,
CHESTER MARR.